US007410701B2

(12) United States Patent
Yasui et al.

(10) Patent No.: US 7,410,701 B2
(45) Date of Patent: Aug. 12, 2008

(54) COMPONENT FOR ROTARY MACHINE AND ROTARY MACHINE

(75) Inventors: Toyoaki Yasui, Hiroshima (JP); Yoshikazu Yamada, Hiroshima (JP); Katsuyasu Hananaka, Hiroshima (JP); Satoshi Hata, Hiroshima (JP); Yuzo Tsurusaki, Hiroshima (JP); Osamu Isumi, Hiroshima (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 183 days.

(21) Appl. No.: 11/350,122

(22) Filed: Feb. 9, 2006

(65) Prior Publication Data

US 2006/0228541 A1 Oct. 12, 2006

(30) Foreign Application Priority Data

Apr. 12, 2005 (JP) ............................ 2005-115003

(51) Int. Cl.

*B32B 15/04* (2006.01)
*B32B 15/08* (2006.01)
*F01D 5/14* (2006.01)
*F04D 29/38* (2006.01)

(52) U.S. Cl. ...................... 428/421; 428/613; 428/614; 428/457; 416/241 R; 416/241 A

(58) Field of Classification Search ................ 428/613, 428/614, 615, 627, 630, 632, 634, 421, 422, 428/457; 416/241 R, 241 A, 241 B See application file for complete search history.

(56) References Cited

U.S. PATENT DOCUMENTS

| | | | | |
|---|---|---|---|---|
| 5,576,069 | A | 11/1996 | Chen et al. | |
| 5,629,082 | A * | 5/1997 | Baureis et al. | 428/306.6 |
| 5,805,973 | A | 9/1998 | Coffinberry et al. | |
| 2003/0049485 | A1* | 3/2003 | Brupbacher et al. | 428/615 |
| 2005/0249964 | A1* | 11/2005 | Nakajima et al. | 428/553 |

FOREIGN PATENT DOCUMENTS

| | | | | |
|---|---|---|---|---|
| DE | 196 53 217 | A1 | | 6/1997 |
| DE | 698 26 096 | T2 | | 9/2005 |
| EP | 0 608 081 | A1 | | 7/1994 |
| JP | 7-3460 | | | 1/1995 |
| JP | 7-40506 | | | 2/1995 |
| JP | 07-040506 | | * | 2/1995 |
| WO | 2004/016819 | | | 2/2004 |

* cited by examiner

*Primary Examiner*—Michael La Villa
(74) *Attorney, Agent, or Firm*—Wenderoth, Lind & Ponack, L.L.P.

(57) ABSTRACT

A coating layer is provided on a surface of the moving blades of a rotary machine. The coating layer includes a spray layer on the base material of the moving blades and a fluorocarbon resin layer on the spray layer. The spray layer is porous. The fluorocarbon resin layer is made of fluorocarbon resin. The fluorocarbon resin layer also contains an inorganic substance that is exposed on the surface of the fluorocarbon resin layer.

16 Claims, 4 Drawing Sheets

COMPONENT FOR ROTARY MACHINE AND ROTARY MACHINE

BACKGROUND OF THE INVENTION

1. Field of the Invention

The present invention generally relates to rotary machines such as steam turbines or compressors. More specifically, the present invention relates to inhibiting adhesion of fine particles contained in air or gas to parts of a rotary machine.

2. Description of the Related Art

Steam turbines include moving blades and stationary blades. A steam turbine is driven by blowing a jet of working fluid such as steam onto the moving blades. Therefore, parts of a steam turbine such as moving blades and stationary blades come in direct contact with a working fluid.

Compressors are used to compress various types of gases in chemical plants. A compressor includes a rotatable impeller, and the impeller is rotated with the help of power received from outside of the compressor to compress a gas. Therefore, even in a compressor, parts such as an impeller and a diffuser come in direct contact with the gas.

The working fluids used in steam turbines or the gases compressed by compressors contain fine particles of silica, iron oxide, or hydrocarbon. When these particles come in contact with the parts of a steam turbine or a compressor, they get adhered to those parts and corrode those parts. As a result, the efficiency of the steam turbine or the compressor is reduced.

Japanese Patent Laid-Open Publication No. H7-40506 teaches to coat the parts of the steam turbines or the compressors with fluorocarbon resin to prevent corrosion of the parts by the fine particles. However, some parts of the steam turbines or the compressors rotate while other parts are stationary. For example, the moving blades of the steam turbines and the impellers of the compressors rotate. Even if the moving parts are coated with fluorocarbon resin, a centrifugal force acts on the rotating parts and weakens the anticorrosive action of the coat of the fluorocarbon resin. Thus, there is a need for a technology that can surely protect the rotating parts of steam turbines and compressors from the fine particles.

SUMMARY OF THE INVENTION

It is an object of the present invention to at least solve the problems in the conventional technology.

According to an aspect of the present invention, a component used as a rotating body in rotary machines and that comes in direct contact with a gas containing fine particles includes a coating (10) on a surface thereof. The coating (10) includes a porous spray layer (2) that rests on the surface and at least one fluorocarbon resin layer (5) that rests on the spray layer (2) and having fluorocarbon resin containing an inorganic substance. A surface occupying ratio of the inorganic substance with respect to the surface of the fluorocarbon resin is not less than 50% and not more than 80%.

According to an aspect of the present invention, a rotary machine includes the above component.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings. The present invention is, however, not limited to the exemplary embodiments. Elements in the embodiments include the matters that those skilled in the art can easily anticipate, or substantially the same matters. The present invention can be suitably applied to a component of a rotary machine such as a steam turbine and a compressor that is contacted with a gas containing fine particles of silica or the like. A rotating component (for example, a moving blade or a rotor) of a rotary machine is explained below by way of example; however, the present invention can also be applied to other components.

The surface of a component of a rotary machine according to the embodiment is coated with a coating layer having a spray layer with a plurality of pores provided therein, and a fluorocarbon resin layer with an inorganic substance formed on the spray layer exposed thereon.

Figure 1:
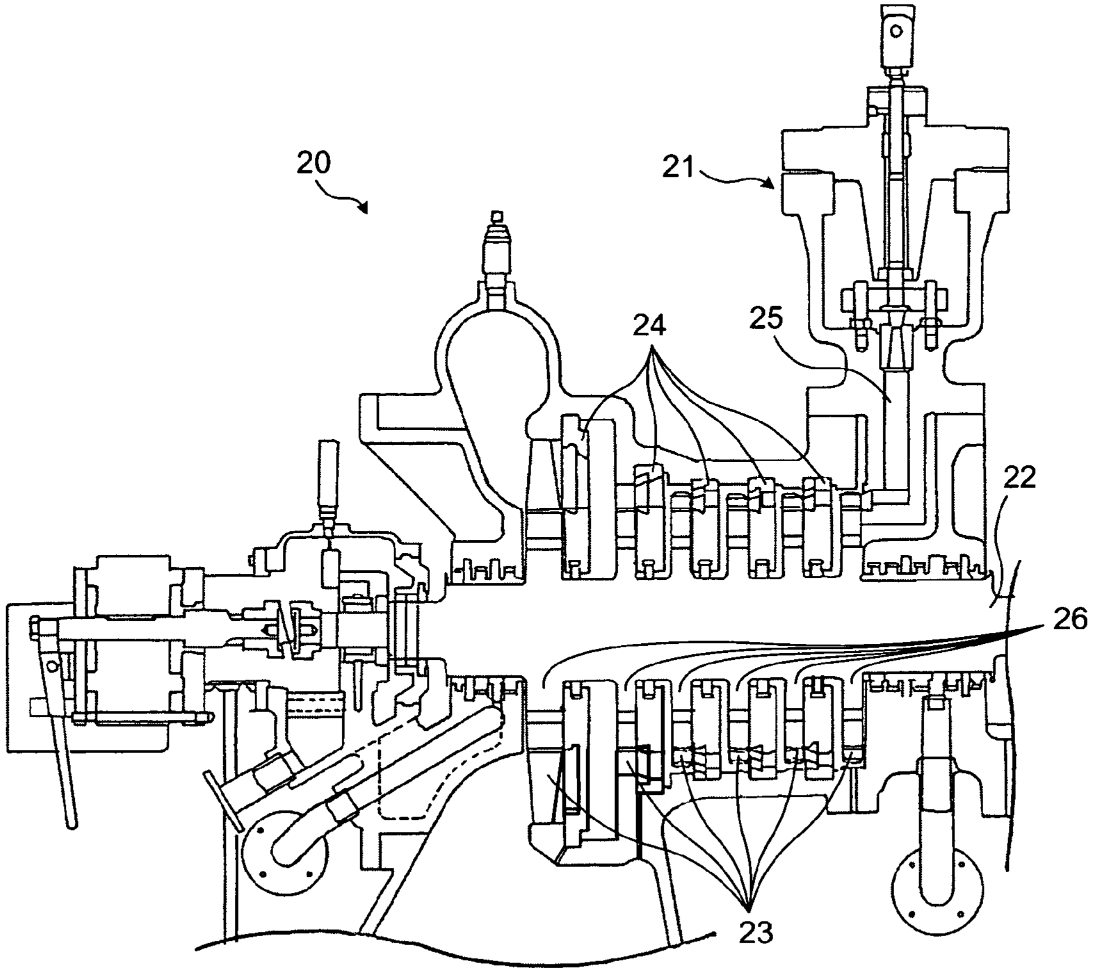
FIG. 1 is a cross-section of a turbine chamber of a steam turbine according to an embodiment of the present invention.

FIG. 1 is a cross-section of a turbine chamber of a steam turbine 20 according to the embodiment. The steam turbine 20 includes moving blades whose surfaces are coated with a plate coating containing fluorocarbon resin particles. The steam turbine 20, as a rotary machine, converts the pressure of steam supplied from a steam supply pipe 25, openable and closable with a steam inlet valve 21, into rotating force. The rotating force is used in a generator or the like via a reducer. A plurality of turbine disks 26 are attached to a rotor shaft 22 for obtaining the rotating force. A plurality of moving blades 23 is attached in a row onto the outer circumference of the turbine disk 26 to form a moving blade row. The moving blades 23 receive the steam supplied from the steam supply pipe 25 to rotate the rotor shaft 22.

A nozzle partition plate 24 having a plurality of nozzle vanes is placed between the moving blades 23, and the nozzle partition plate 24 rectifies the steam passing through the nozzle vanes to allow the steam to effectively contact the moving blades 23. As shown in FIG. 1, when the steam turbine 20 has a plurality of moving blades, a plurality of nozzle vanes is provided. In this case, each of the nozzle partition plates 24 often has a different number and size of the nozzle vanes, however, the configuration of each nozzle vane is the same.

Figure 2:
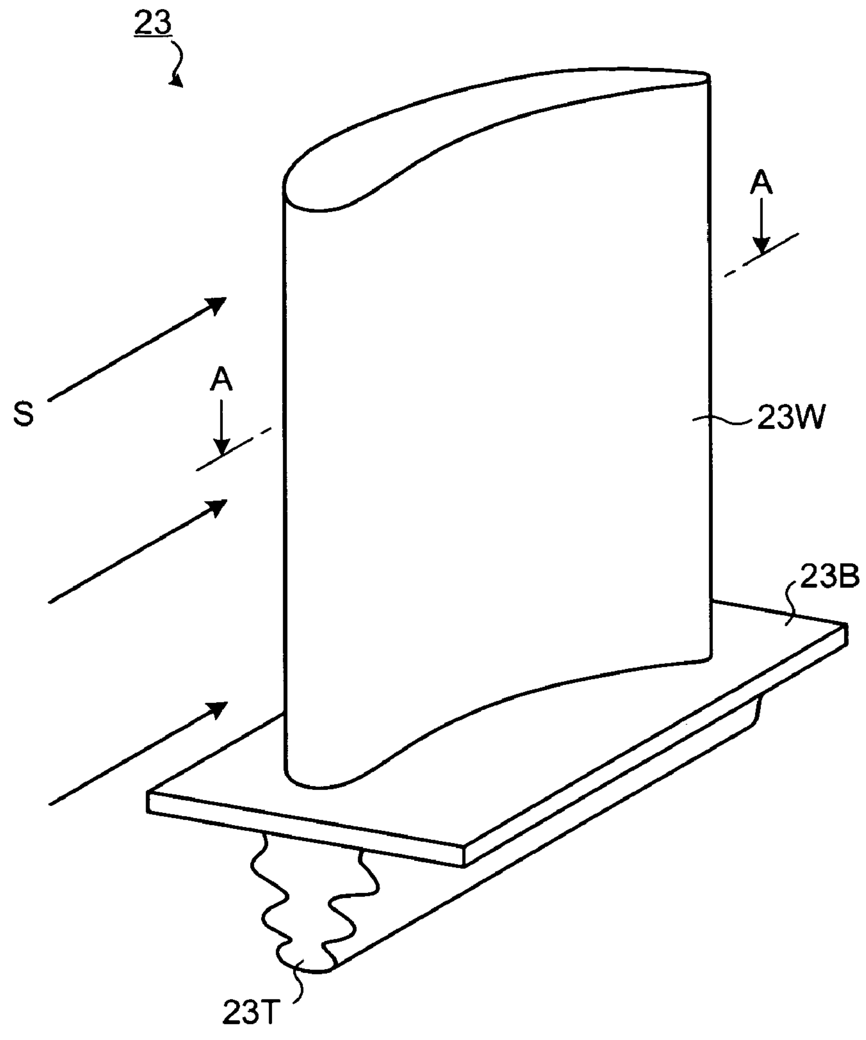
FIG. 2 is a perspective diagram of a moving blade of the steam turbine shown in FIG. 1.
Figure 3:
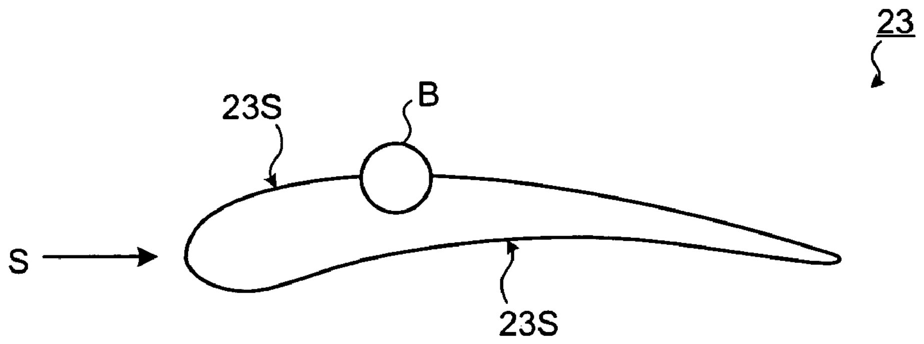
FIG. 3 is a cross-section of the moving blade shown in FIG. 2 taken along the line A-A.

FIG. 2 is a perspective diagram for explaining a moving blade of a steam turbine with the surface thereof coated with a plate coating containing fluorocarbon resin particles according to the embodiment. FIG. 3 is a cross-sectional diagram of the moving blade shown in FIG. 2 taken along the line A-A. The moving blades 23 is a component of the steam turbine 20 as a rotary machine, and is configured to have a base 23B, to which a blade 23W is attached. A blade fixing unit 23T is provided on the other side of the blade 23W on the base 23B. The blade fixing unit 23T is inserted into a blade attachment groove, which is formed on the outer circumference of the turbine disk 26 and has the same shape as the blade fixing unit 23T, and is attached to the turbine disk 26.

The moving blades 23 on the steam turbine 20 rotate along with the turbine disk 26 when a high-temperature and high-pressure steam is injected onto the moving blades 23. The moving blades 23 are therefore subjected to a strong centrifugal acceleration and a high temperature. Thus, the moving blades 23 are manufactured out of a material having a high intensity and heat resistance. In the embodiment, the moving blades 23 are manufactured out of martensitic stainless steel.

In the steam turbine 20, fine particles of $SiO_2$, iron oxide ($Fe_3O_4$), and the like contained in steam are adhered onto a surface 23S of the moving blades 23 or a surface of the nozzle vanes. In a rotary machine such as a compressor, fine particles of hydrocarbon (HC), silica, and the like contained in a gas to be compressed are also adhered onto the surface of the component that is contacted with the gas. After operation for a long period of time, the fine particles accumulate on the surface 23S of the moving blades 23 or the surface of the nozzle vanes, which reduces the heat efficiency of the steam turbine or the compression efficiency of the compressor.

To solve these problems, in the embodiment, surfaces 23S of the moving blades 23, which is a base material, are provided with a coating layer having a spray layer made of, for example, Ni, Co, Mo, or iron alloy, and a fluorocarbon resin layer formed on the spray layer and containing an inorganic substance occupying its surface in a prespecified ratio. The coating layer prevents fine particles in steam from adhering to the surface 23S of the moving blades 23, and improves adhesion of the fluorocarbon resin layer to the base material.

Figure 4:
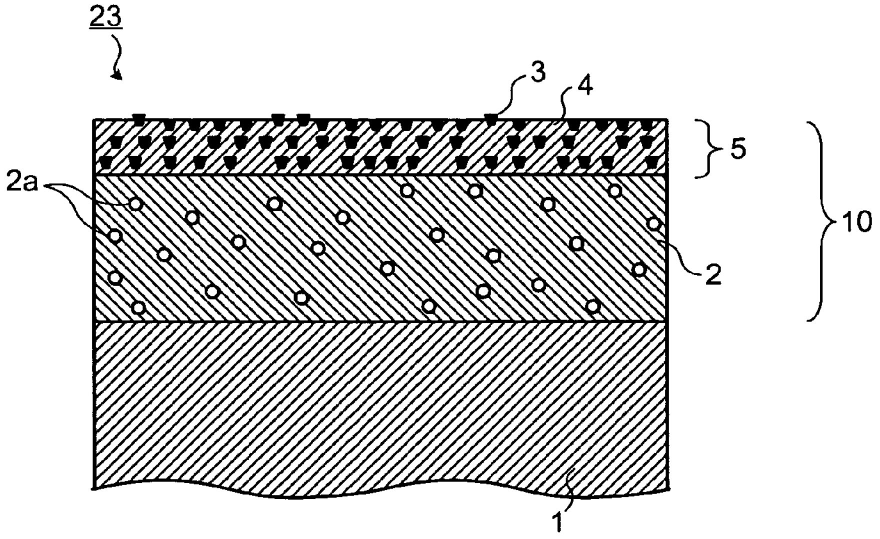
FIG. 4 is an enlarged view of a surface of the moving blade shown in FIG. 2.

FIG. 4 is a simulated diagram for explaining a surface of one of the moving blades according to the embodiment. The figure represents an enlarged and simulated surface 23S of one of the moving blades 23 according to the embodiment (a section encircled with B in FIG. 3). The moving blades 23 according to the embodiment are components of the steam turbine 20 as a rotary machine, are employed for a rotational body dealing with a gas containing fine particles, and are a structure that is contacted with the gas containing fine particles. Each of the moving blades 23 has a coating layer 10 on the surface of its base material (martensitic stainless steel in the embodiment) 1. The coating layer 10 includes a spray layer 2 formed on the base material 1 of the moving blades 23 and a fluorocarbon resin layer 5 formed on the surface of the spray layer 2.

The spray layer 2 is formed by spraying metal, or cermet made of metal and carbide or oxide on the surface of the moving blades 23 through the method of plasma spraying. The method of spraying applicable to the present invention is not specifically limited to the plasma spraying. Other spraying methods that employ a combustion gas as a heat source such as frame spraying, that employ electric energy as a heat source such as plasma spraying and arc spraying, and that employ a laser beam as a heat source can be also applied to the present invention. The spraying method is properly selected according to the material used for the spray layer 2 or the base material 1.

The spray layer 2 can include any one of pure metal among Ni, Co, and Mo, or any one of Ni alloy, Co alloy, Mo alloy, and iron alloy. The spray layer 2 can include cermet made of any one of the pure metal among Ni, Co and Mo, and at least one or more of carbide, oxide, and boride, or, cermet made of any one of Ni alloy, Co alloy, Mo alloy, and iron alloy, and at least one or more of carbide, oxide, and boride.

The spray layer 2 has a plurality of pores 2*a* formed therein. The fluorocarbon resin 4 infiltrates the pores 2*a* formed in the spray layer 2, so that a fluorocarbon resin layer 5 and the spray layer 2 are interconnected. This enables an improved adhesion between the fluorocarbon resin layer 5 and the spray layer 2. Thus, the spray layer 2 that is firmly adhered to the base material 1 of the moving blades 23 is adhered to the fluorocarbon resin layer 5, allowing an improved adhesion between the fluorocarbon resin layer 5 and the base material 1. As a result, even when a strong centrifugal force caused by rotation acts on the coating layer 10, peeling of the fluorocarbon resin layer 5 can be inhibited, and durability of the coating layer 10 can be also prevented from being lowered.

To infiltrate the fluorocarbon resin 4 into the pores 2*a* formed in the spray layer 2 and to improve adhesion between the spray layer 2 and the fluorocarbon resin layer 5, it is preferable that the ratio of pores contained in the spray layer 2 is more than 15%. When the ratio of pores contained in the spray layer 2 is higher than the ordinary ratio of pores of 5% to 15%, infiltration of the fluorocarbon resin is enhanced. On the other hand, when the ratio of pores contained in the spray layer 2 is more than 30%, the strength of the spray layer 2 may be decreased, thereby producing a crack in the spray layer 2. It is therefore preferable that the ratio of pores contained in the spray layer 2 is equal to or less than 30%. The ratio of pores contained refers to the ratio of the volume occupied by the pores 2*a* in the total volume of the spray layer 2.

The fluorocarbon resin layer 5 includes fluorocarbon resin 4 containing an inorganic substance 3. The moving blades 23, in particular, of a steam turbine are employed at a high temperature (for example, at 200 to 300 degrees Celsius), so that it is necessary to inhibit softening or peeling of the fluorocarbon resin layer 5 under such an environment. When the inorganic substance occupies less than 50% of the surface of the fluorocarbon resin layer 5, the coating hardness of the fluorocarbon resin layer 5 rapidly decreases. On the other hand, when the inorganic substance occupies more than 80% of the surface of the fluorocarbon resin layer 5, the effect of reducing the amount of fine particles adhered to the surface of the fluorocarbon resin layer 5 rapidly decreases. It is therefore preferable that the ratio that the inorganic substance 3 occupies in the surface of the fluorocarbon resin layer 5 is not less than 50% nor more than 80%. The ratio that the inorganic substance 3 occupies of the surface of the fluorocarbon resin layer 5, hereinafter, the surface occupying ratio, refers to the ratio that the inorganic substance 3 exposed on the surface of the fluorocarbon resin 4 occupies in the surface of the fluorocarbon resin layer 5 when viewed from above.

In the embodiment, the fluorocarbon resin 4 can include at least any one of polytetrafluoroethylene (PTFE), tetrafluoroethylene-hexafluoropropylene copolymers (FEP), tetrafluoroethylene-perfluoroalkylvinylether copolymers (PFA), polyvinylidene fluoride (PVDF), ethylene-chlorotrifluoroethylene copolymers (ECTFE), and ethylene-tetrafluoroethylene copolymers (ETFE). The fluorocarbon resin layer 5 is required to be formed at least in one layer on the surface of the base material 1 of the moving blades 23, and can be formed in multilayers, such as two layers and three layers. The inorganic substance contained in the fluorocarbon resin layer 5 can be at least any one of glass, ceramics, and carbon.

Evaluation 1

Test pieces of the low-adhesion coating according to the present invention were manufactured to evaluate particle adhesion using a device for evaluating the particle adhesion. Each of the test pieces used for evaluating the coating layer in Evaluation Examples 1 to 3 according to the present invention, Evaluation Example 4, and an Example based on the conventional technology used SUS410J1 base material 20 millimeters×20 millimeters×5 millimeters in size. The coating layer (low-adhesion coating) for Evaluation Examples 1 to 3 according to the present invention, Evaluation Example 4, and an Example based on the conventional technology were formed on the base material. The details of the test pieces with the fluorocarbon resin containing plate coating formed thereon according to Evaluation Examples 1 to 3 of the present invention and the test piece according to Evaluation Example 4, and the evaluation result are shown in Table 1.

TABLE 1

| | | | Spray layer | | | Fluorocarbon resin layer | | | |
|---|---|---|---|---|---|---|---|---|---|
| | No. | Base material | Material | Ratio of pores (%) | Thickness (μm) | Material of fluorocarbon resin layer | Inorganic substance and surface occupying ratio (%) | Thickness (μm) | Scale of particles adhesion |
| Evaluation Example | 1 | SUS 410 J1 | Hastelloy | 15 | 70 | PTFE | Alumina/50 | 50 | 0.20 |
| | 2 | SUS 410 J1 | Ni—20Cr | 10 | 70 | PFA | SiC/80 | 50 | 0.22 |
| | 3 | SUS 410 J1 | Cr3C2—25NiCr | 6 | 70 | FEP | Graphite/50 | 50 | 0.24 |
| Evaluation Example | 4 | SUS 410 J1 | Hastelloy | 15 | 70 | PTFE | Alumina/90 | 50 | 0.80 |
| Example based on conventional tech. | 5 | SUS 410 J1 | — | — | — | — | — | — | 1.0 |

(1) Evaluation Example (No. 1 in Table 1)

The base material was ground to finish its surface roughness to Ra=0.50 micrometers and Ry=3.50 micrometers. The base material was blasted with alumina as a pretreatment, and a layer 70 micrometers thick of Hastelloy C alloy was formed on the base material through the plasma spray method. Another layer 50 micrometers thick of the PTFE paint containing alumina particles was formed further on the base material through the spray method. After the painting, the base material was calcinated at 400 degrees Celsius. The ratio of pores in the spray layer then was 15%, and the surface occupying ratio of the inorganic substance on the fluorocarbon resin was 50%. The spray conditions and the content of alumina particles in the paint were adjusted to form a suitable layer.

(2) Evaluation Example (No. 2 in Table 1)

The base material was ground to finish its surface roughness to Ra=0.50 micrometers and Ry=3.50 micrometers. The base material was blasted with alumina as a pretreatment, and a layer 70 micrometers thick of Ni-20Cr alloy was formed on the base material through the plasma spray method. Another layer 50 micrometers thick of the PFA powder containing silicon carbide particles was formed further on the base material through the electrostatic spraying method. After forming the layers, the base material was calcinated at 400 degrees Celsius. The ratio of pores in the spray layer then was 10%, and the surface occupying ratio of the inorganic substance on the fluorocarbon resin was 80%. The spray conditions and the content of silicon carbide particles in the paint were adjusted to form a suitable layer.

(3) Evaluation Example (No. 3 in Table 1)

The base material was ground to finish its surface roughness to Ra=0.50 micrometers and Ry=3.50 micrometers. The base material was blasted with alumina as a pretreatment, and a layer 70 micrometers thick of $Cr_3C_2$-25NiCr cermet was formed on the base material surface occupying the plasma spray method. Another layer 50 micrometers thick of the FEP powder containing graphite particles was formed further on the base material through the electrostatic spraying method. After forming the layers, the base material was calcinated at 400 degrees Celsius. The ratio of pores in the spray layer then was 6%, and the surface occupying ratio of the inorganic substance on the fluorocarbon resin was 50%. The spray conditions and the content of graphite particles in the paint were adjusted to form a suitable layer.

(4) Evaluation Example (No. 4 in Table 1)

The base material was ground to finish its surface roughness to Ra=0.50 micrometers and Ry=3.50 micrometers. The base material was blasted with alumina as a pretreatment, and a layer 70 micrometers thick of Hastelloy C alloy was formed on the base material through the plasma spray method. Another layer 50 micrometers thick of the PTFE painting containing alumina particles was formed further on the base material through the spray method. After the painting, the base material was calcinated at 400 degrees Celsius. The ratio of pores in the spray layer then was 15%, and the surface occupying ratio of the inorganic substance surface on the fluorocarbon resin was 90%. The spray conditions and the content of alumina particles in the paint were adjusted to form a suitable layer.

(5) Example Based on the Conventional Technology (No. 5 in Table 1)

The base material was ground to finish its surface roughness to Ra=0.50 micrometers and Ry=3.50 micrometers. A coating layer made of the fluorocarbon resin (PTFE) based on the conventional technology was formed on the surface of a test piece.

Test Method of Evaluating Adhesion of Particles

Figure 5:
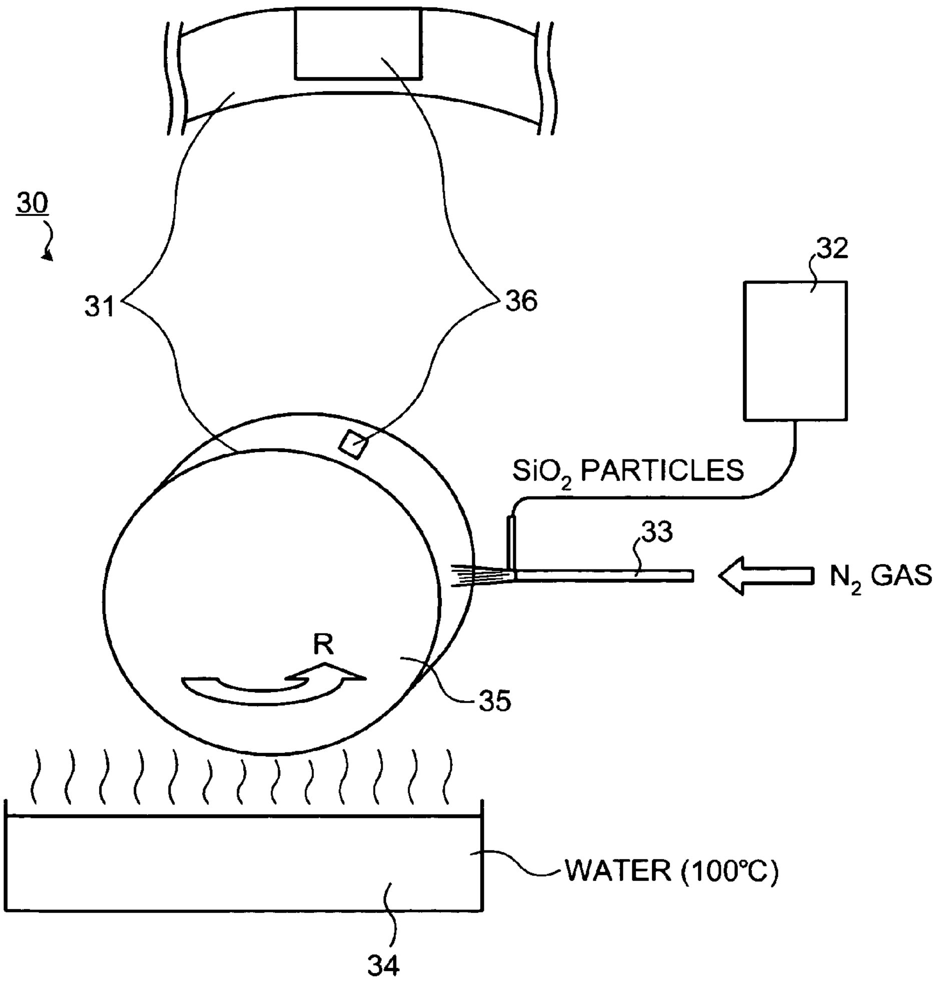
FIG. 5 is a schematic of a test device used to evaluate adhesion of particles to the moving blade shown in FIG. 2.

FIG. 5 is a block diagram of a test device used for a test of evaluating adhesion of particles. In the test device 30, a test piece 36 prepared by the procedure above is inserted into a drum 31 and is tested for evaluating adhesion of particles. The drum 31 in the test device 30 is 300 millimeters in diameter and 100 millimeters in width.

In the test for evaluating adhesion of particles, ultrafine particles of silica ($SiO_2$) conveyed by nitrogen ($N_2$) gas while the drum 31 is rotating are sprayed on and adhered to the surface of the test piece 36. The nitrogen gas was injected through a nozzle 33, and silica particles are fed from a particles feeding device 32 to and around the outlet of the nozzle 33. A water tank 34 is placed under the drum 31. Water in the water tank 34 is heated to boiling at 100 degrees Celsius, so that moisture is provided to the test piece 36. The test piece 36 is heated by a heater 35 placed inside the drum 31.

Test Conditions

The rotation number of the drum 31 was 10 rpm, and that of the test piece 36 was naturally the same. The silica particles used were fumed silica (grade 50) produced by Nippon Aerosil Co., LTD. The test piece 36 was heated at 80 degrees Celsius. The collision speed of the silica particles were 300 m/s, and the test time was 150 hours.

(Evaluation Method)

A difference in the mass of the test piece 36 was measured before and after the test to determine the amount of adhesion of the silica particles. The ratio between the amount of the silica particles adhered to the surface of the test piece 36, Y(g), and the amount of the silica particles adhered to the surface (surface roughness, Rz=3.5 micrometers) of the base material (SUS410J1) for the test piece, X(g), was calculated as the scale of the amount of adhered particles, Z, with the equation (1) expressed as follows:

$$Z=Y/X \quad (1)$$

As shown in Table 1, the coating layer according to the present invention (Evaluation Examples 1 to 3) had a smaller amount of the adhered silica particles and a lower adhesion compared with Evaluation Example 4 and the Example based on the conventional technology.

(Evaluation 2)

Test pieces of the coating layer according to the present invention were manufactured to evaluate the adhesion of particles. The coating layer according to the present invention was formed on the SUS410J1 base material 20 millimeters×20 millimeters in size and 5 millimeters in thickness to prepare the test pieces used for evaluating the coating layer in Evaluation Examples 1 to 3 shown in Table 1 (No. 1 to No. 3 in Table 1). To evaluate adhesion of the test piece, the prepared test piece was inserted and fixed into a rotary drum, and was rotated at a peripheral velocity of 100 m/s for a prespecified period of time to examine the state of the test piece after rotation. The test environment was as follows: A tank that includes a 3% NaCl containing water heated to boiling at 100 degrees Celsius was placed under the rotary drum, and stainless plates surrounded the rotary drum. The test piece was heated by a heater from the inside of the rotary drum to obtain the surface temperature of the test piece of 250 degrees Celsius.

The coating layer according to the present invention was formed on the SUS410J1 base material 20 millimeters×20 millimeters in size and 5 millimeters in thickness to prepare the particles low-adhesion coating for Evaluation Example 4 (No. 4 in Table 1). A fluorocarbon resin (PTFE) coating layer was also formed on the SUS410J1 base material 20 millimeters×20 millimeters in size and 5 millimeters in thickness to prepare the coating for Example based on the conventional technology. Adhesion of the test pieces for Evaluation Example 4 and the Example based on the conventional technology were evaluated in the same way as that for Evaluation Examples 1 to 3. The evaluation of adhesion demonstrated that each of the test pieces for Evaluation Examples 1 to 3 (No. 1 to No. 3 in Table 1) was in good condition without any blister being recognized. The test piece for Evaluation Example 4 was suffered from a partial peeling accompanied by a flow of the coating. The coating of the test piece for Example (No. 5 in Table 1) based on the conventional technology was totally peeled off. It is thus understood that the present invention can provide an excellent adhesion of the coating to the base material.

Figure 6:
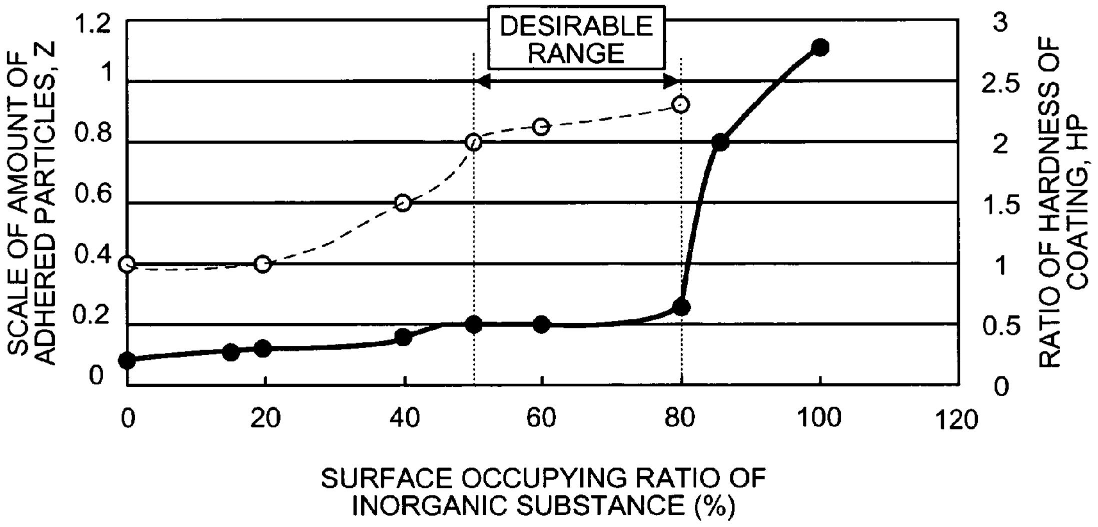
FIG. 6 is a graph for explaining a relation between surface occupying ratio of the inorganic substance contained in fluorocarbon resin layer, the scale of the amount of adhered particles, and the ratio of hardness of coating.

FIG. 6 is a diagram for explaining the relation between the surface occupying ratio of the inorganic substance included in the fluorocarbon resin layer, the scale of the amount of adhered particles, and the ratio of hardness of the coating. FIG. 6 demonstrates the result of evaluating the amount of adhered particles and the hardness of the coating, when the surface occupying ratio of the inorganic substance on the fluorocarbon resin layer is changed. The white circle in FIG. 6 denotes the ratio of hardness of the coating, Hp, and the black circle denotes the scale of the amount of adhered particles, Z.

The scale of the amount of adhered particles can be expressed by the equation (1). The ratio of hardness of the coating, Hr, is obtained by dividing the hardness of the fluorocarbon resin coating with the inorganic substance exposed on the surface thereof, Hp, by the hardness of the fluorocarbon resin coating having the surface occupying ratio of 0% of the inorganic substance, Hb, (Hp/Hb). In the evaluation, alumina ceramics having the average diameter of 10 micrometers is used as the inorganic substance contained by the fluorocarbon resin.

As seen in FIG. 6, when the surface occupying ratio of the inorganic substance on the fluorocarbon resin layer is less than 50%, hardness of the fluorocarbon resin coating rapidly decreases, and may easily be cracked. In a rotary component subjected to a strong centrifugal force, a fluorocarbon resin coating peels off starting from the crack, so that, when the surface occupying ratio of the inorganic substance is less than 50%, durability of the fluorocarbon resin coating is likely to be insufficient for use on a rotary component. On the other hand, when the surface occupying ratio of the inorganic substance is more than 80%, the effect of reducing the amount of fine particles adhered to the surface of the fluorocarbon resin layer 5 rapidly decreases, which is not suitable to effectively inhibit adhesion of particles. It is thus preferable that the surface occupying ratio of the inorganic substance is not less than 50% nor more than 80%.

As explained above, the component for a rotary machine and the rotary machine according to the present invention can effectively inhibit adhesion of fine particles of silica, iron oxide, or the like contained in a gas used for the rotary machine, and can also inhibit a reduced durability of a coating layer of the component for the rotary machine.

The component for the rotary machine includes moving blades and stationary blades used for a steam turbine, a compressor, or other rotary machines. The surface of the component is coated with a coating layer having a spray layer having a plurality of pores provided therein, and a fluorocarbon resin layer having an inorganic substance formed on the spray layer exposed thereon, the inorganic substance occupying not less than 50% nor more than 80% of the surface thereof. This enables the hardness of the fluorocarbon resin to be maintained. The coating layer allows fluorocarbon resin in the fluorocarbon resin layer to infiltrate into the pores of the spray layer, so that adhesion of the coating layer to the component of a rotary machine can be improved. Durability of the coating layer is thus prevented from lowering, even when the coating layer is subjected to centrifugal force. Furthermore, the fluorocarbon resin layer with the inorganic substance exposed thereon is provided on the surface of the coating layer, so that the fluorocarbon resin layer effectively inhibits the adhesion of fine particles of silica, iron oxide, or the like contained in a gas used for a rotary machine.

When the spray layer is used for a component of the rotary machine according to the present invention, it is preferable that the content of pores contained in the spray layer is more than 15%, and equal to or less than 30%. Adhesion between the spray layer and the fluorocarbon resin layer can be thus improved.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A component for use as a rotating body in a rotary machine and that comes in direct contact with a gas containing fine particles, comprising:

a coating on a surface of the component, the coating comprising:

a porous spray layer formed on a surface of the component, the porous spray layer having a porosity in a range of 6% to 30%; and at least one fluorocarbon resin layer formed on the spray layer, the at least one fluorocarbon resin layer comprising fluorocarbon resin and an inorganic substance, wherein, as seen in plan view, a surface occupying ratio of a first area occupied by the inorganic substance exposed at an outer surface of the fluorocarbon resin layer to a whole outer surface area of the fluorocarbon resin layer is in a range of 50% to 80%.

2. The component according to claim 1, wherein the spray layer includes any one of Ni, Co, and Mo.

3. The component according to claim 1, wherein the spray layer includes any one of Ni alloy, Co alloy, Mo alloy, and iron alloy.

4. The component according to claim 1, wherein the spray layer includes a cermet including:

any one of Ni, Co, and Mo: and one or more of carbide, oxide, and boride.

5. The component according to claim 1, wherein the spray layer includes a cermet including:

one of Ni alloy, Co alloy, Mo alloy, and iron alloy; and one or more of carbide, oxide, and boride.

6. The component according to claim 1, wherein the fluorocarbon resin in the fluorocarbon resin layer includes one or more of polytetrafluoroethylene (PTFE), tetrafluoroethylene-hexafluoropropylene copolymers (FEP), tetrafluoroethylene-perfluoroalkylvinylether copolymers (PFA), polyvinylidene fluoride (PVDF), ethylene-chlorotrifluoroethylene copolymers (ECTFE), and ethylene-tetrafluoroethylene copolymers (ETFE).

7. The component according to claim 1, wherein the inorganic substance includes one or more of glass, ceramics, and carbon.

8. The component according to claim 1, wherein the spray layer has a porosity in a range of 15% to 30%.

9. A rotary machine having a component used as a rotating body that comes in direct contact with a gas containing fine particles, the component comprising:

a coating on a surface of the component, the coating comprising:

a porous spray layer formed on a surface of the component, the porous spray layer having a porosity in a range of 6% to 30%; and at least one fluorocarbon resin layer formed on the spray layer, the at least one fluorocarbon resin layer comprising fluorocarbon resin and an inorganic substance, wherein, as seen in plan view, a surface occupying ratio of a first area occupied by the inorganic substance exposed at an outer surface of the fluorocarbon resin layer to a whole outer surface area of the fluorocarbon resin layer is in a range of 50% to 80%.

10. The rotary machine according to claim 9, wherein the spray layer includes any one of Ni, Co, and Mo.

11. The rotary machine according to claim 9, wherein the spray layer includes any one of Ni alloy, Co alloy, Mo alloy, and iron alloy.

12. The rotary machine according to claim 9, wherein the spray layer includes a cermet including:

any one of Ni, Co, and Mo: and one or more of carbide, oxide, and boride.

13. The rotary machine according to claim 9, wherein the spray layer includes a cermet including:

one of Ni alloy, Co alloy, Mo alloy, and iron alloy; and one or more of carbide, oxide, and boride.

14. The rotary machine according to claim 9, wherein the fluorocarbon resin in the fluorocarbon resin layer includes one or more of polytetrafluoroethylene (PTFE), tetrafluoroethylene-hexafluoropropylene copolymers (FEP), tetrafluoroethylene-perfluoroalkylvinylether copolymers (PFA), polyvinylidene fluoride (PVDF), ethylene-chlorotrifluoroethylene copolymers (ECTFE), and ethylene-tetrafluoroethylene copolymers (ETFE).

15. The rotary machine according to claim 9, wherein the inorganic substance includes one or more of glass, ceramics, and carbon.

16. The component according to claim 9, wherein the spray layer has a porosity in a range of 15% to 30%.

* * * * *